US011403517B2

(12) United States Patent
Tickoo et al.

(10) Patent No.: US 11,403,517 B2
(45) Date of Patent: Aug. 2, 2022

(54) PROXIMITY-BASED DISTRIBUTED SENSOR PROCESSING

(71) Applicant: Intel Corporation, Santa Clara, CA (US)

(72) Inventors: Omesh Tickoo, Portland, OR (US); Jonathan J. Huang, Pleasanton, CA (US); Willem M. Beltman, West Linn, OR (US); Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 980 days.

(21) Appl. No.: 16/143,738

(22) Filed: Sep. 27, 2018

(65) Prior Publication Data
US 2019/0050718 A1    Feb. 14, 2019

(51) Int. Cl.
*G06N 3/063* (2006.01)
*G06N 3/10* (2006.01)
*G01C 21/28* (2006.01)
*H04W 28/02* (2009.01)
*H04W 84/18* (2009.01)

(52) U.S. Cl.
CPC ............. *G06N 3/063* (2013.01); *G01C 21/28* (2013.01); *G06N 3/10* (2013.01); *H04W 28/021* (2013.01); *H04W 84/18* (2013.01)

(58) Field of Classification Search
CPC . G06N 3/063; G06N 3/10; G06N 3/08; G01C 21/28; H04W 28/021; H04W 84/18
See application file for complete search history.

(56) References Cited

U.S. PATENT DOCUMENTS

| 10,325,166 | B2 * | 6/2019 | Kwant | G06K 9/4642 |
| 10,332,320 | B2 * | 6/2019 | Lakshamanan | G06N 3/0445 |
| 10,489,222 | B2 * | 11/2019 | Sathyanarayana | G07C 5/008 |
| 10,535,006 | B2 * | 1/2020 | Kwant | G06N 3/08 |

(Continued)

OTHER PUBLICATIONS

Teerapittayanon, Surat, et al., "Distributed Deep Neural Networksoverthe Cloud, the Edge and End Devices", 37th International Conference on Distributed Computing Systems ICDCS 2017, (2017), 12 pgs.

(Continued)

*Primary Examiner* — Ahmed Elallam
(74) *Attorney, Agent, or Firm* — Schwegman Lundberg & Woessner, P.A.

(57) ABSTRACT

Various systems and methods for implementing distribution of a neural network workload are described herein. A discovery message is encoded that includes a latency requirement and requested resources for a workload of a neural network. A discovery response, from a proximate resource and in response to the discovery message, is decoded and includes available resources of the proximate resource available for the workload based on the requested resources for the workload. The proximate resource is selected to execute the workload based on the available resources of the proximate resource. In response to the discovery response, an offload request is encoded that includes a description of the workload. The description of the workload identifies the node to execute at the proximate resource. In response to the offload request, an input is provided to a ADAS system based on the result.

25 Claims, 7 Drawing Sheets

(56) References Cited

U.S. PATENT DOCUMENTS

| | | | |
|---|---|---|---|
| 10,778,412 B2* | 9/2020 | Chen | G06N 3/08 |
| 2019/0079659 A1* | 3/2019 | Adenwala | H04W 4/026 |
| 2019/0258251 A1* | 8/2019 | Ditty | G06V 20/58 |
| 2020/0294401 A1* | 9/2020 | Kerecsen | G08G 1/096725 |

OTHER PUBLICATIONS

Yi, Z, et al., "Fog computing: Platform and applications", Hot Topics in Web Systemsand Technologies(HotWeb), 2015 Third IEEE Workshop on, (2015), 73-78.

\* cited by examiner

PROXIMITY-BASED DISTRIBUTED SENSOR PROCESSING

TECHNICAL FIELD

Embodiments described herein generally relate to sensor data processing, and in particular, to proximity-based distributed sensor processing in vehicle-to-vehicle (V2V) or vehicle-to-infrastructure (V2I) networks.

BACKGROUND

Autonomous vehicles rely on a vast amount of sensor information to make real time operational decisions. Advanced driver assistance systems (ADAS), which are used to automate, adapt, or enhance vehicle systems to increase safety and provide better driving use a wide variety of sensor data. Applications used to interpret sensor data and act on it are time sensitive. Actuations like steering, braking, navigation, etc. all have bounds on maximum time for response. Examples of such sensors include visible light cameras, radar, laser scanners (e.g., LiDAR), acoustic (e.g., sonar), and the like. As more automotive applications emerge that rely on sensed data, onboard automotive systems are reaching a limit in terms of what can be supported given the constrained platform resources on the vehicle.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
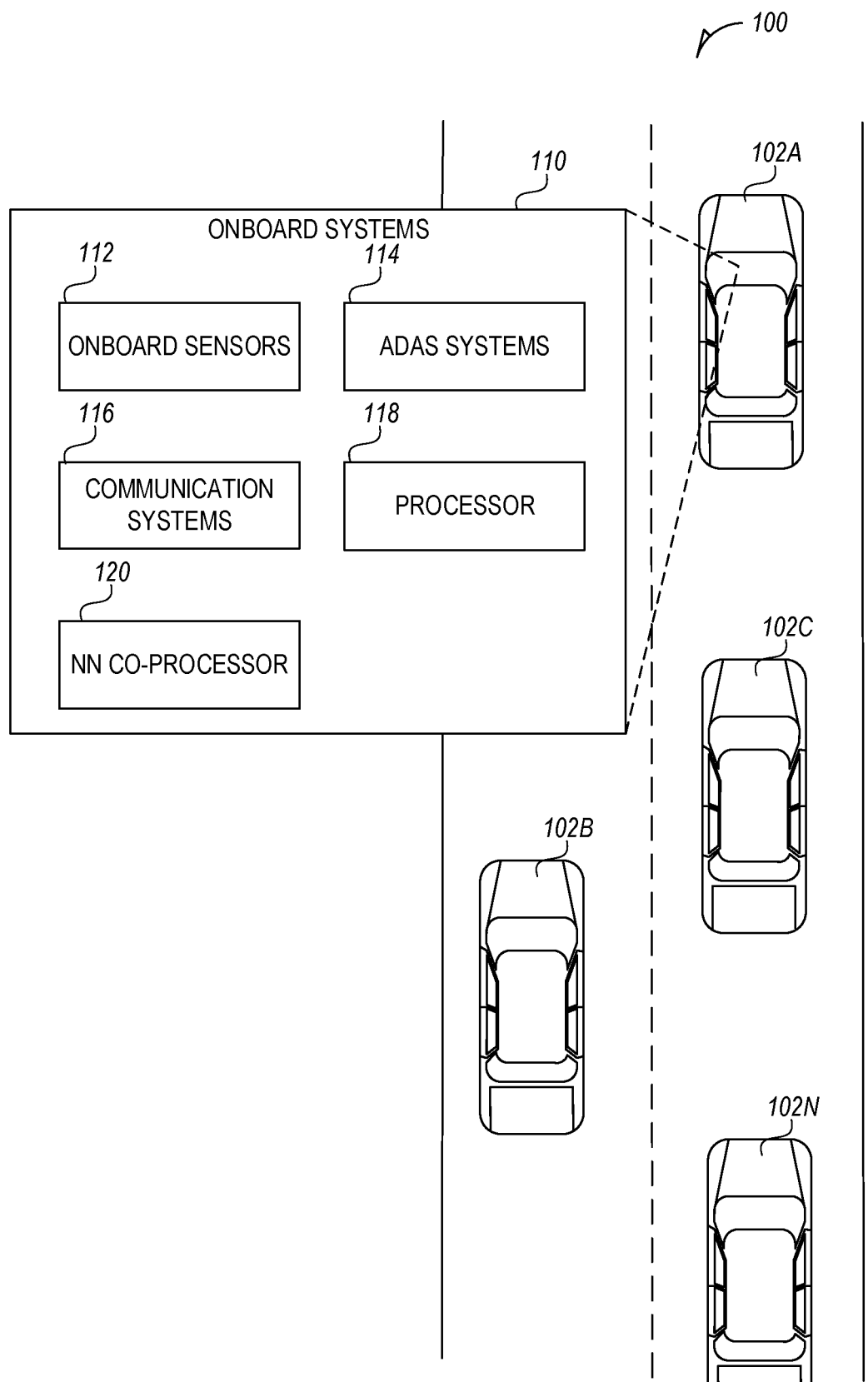
FIG. 1 is a schematic diagram illustrating an operating environment, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Vehicles may include various forward, sideward, and rearward facing sensors. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

Autonomous vehicles (AVs) may be partially or fully autonomous and may operate in a partial or full autonomous mode for some or all of the time. Partial autonomous mode may provide various collision avoidance, driver alert systems, lane change warnings, and the like. In contrast, full autonomous mode may relieve the driver from nearly all operational aspects. Modes may be changed during a driving session. For instance, a driver may operate an AV in partial autonomous mode while in the city, and then initiate full autonomous operation after reaching a stretch of highway.

Autonomous driving and advanced driver assistance systems (ADAS) may rely on signals from a diverse set of sensors including camera, LiDAR, radar, global positioning systems (GPS), and an inertial measurement unit (IMU). The signals are used to perform two primary tasks: simultaneous localization and mapping (SLAM), which generates a map of the environment while simultaneously localizing the vehicle within the map; and detection and tracking of moving objects (DATMO) surrounding the vehicle and the prediction of objects' future behavior.

Object detection and classification, object tracking, collision avoidance, and other decision tasks that involve deep learning, machine learning, neural networks, or other computationally intensive processes, may overtax existing compute resources on a single vehicle. In some conventional systems, to handle the compute load, processing tasks are partitioned between the vehicle and the cloud. For instance, simple recognition tasks may be performed locally at the vehicle (e.g., classifying an object as a vehicle or a building), while more complex recognition tasks are offloaded to the cloud (e.g., facial recognition). However, this conventional partitioning does not scale well and is restricted to areas with fast network connectivity between the vehicle and cloud. As the sensors become more capable they will generate more data, causing a longer delay in transmissions to and from a cloud service. Data growth is coupled with applications that require latency bound guarantees. The result is that the current implementations are poised to hit the scalability wall in very near future.

Instead of a long backhaul of data, applications may use data processing that is locally distributed. Combining the advantages of distributing machine learning tasks across several compute nodes, the innovative platform architecture disclosed here leverages recent advances in neural network recognition technologies along with fast 5G networks (e.g., 5G mmWave) to make fast decisions with minimal compute overhead. In the autonomous vehicle context, compute nodes are represented as vehicles or components in a vehicle. The architecture discussed here leverages vehicle proximity to improve sensing and recognition processes for a given vehicle. Additionally, using local compute resources that are available over short-range telemetry is useful in situations where the vehicles do not have connectivity to cloud services. The result is an improved vehicle compute system that is able to process data faster and provide a higher level of performance to the vehicle's occupants, subsystems, and other components.

FIG. 1 is a schematic diagram illustrating an operating environment 100 according to an embodiment. The operating environment 100 includes a number of vehicles 102A, 102B, 102C, ..., 102N (collectively referred to as 102). The vehicles 102 each have onboard systems 110 that are part of the vehicle. The onboard systems 110 include onboard compute capabilities, which may include or be coupled to onboard sensors 112, advanced driver-assistance systems (ADAS) systems 114, communication systems 116, processor subsystems 118, and neural network (NN) processors 120, and the like. In an example, the processor subsystems 118 and the neural network processor 120 may be the same processor. In various examples, the NN processor 120 coordinates the distribution of computing an output using a neural network. In some examples, the NN processor 120 works in combination with the processor subsystems 118, the communication systems 116, navigational systems 114, and onboard sensors 112 to identify proximate vehicles (e.g., vehicles 102B or 102C) and coordinate the execution of a neural network.

The vehicles 102 may share data (e.g., sensor data), features, and recognition results with each other based on proximity, network communication statistics (e.g., reliability, bandwidth, latency), incident detection, and the like. Data sharing and process cooperation among vehicles 102 provides advantages that increase overall platform capability and well as increased contextual understanding. For instance, if several vehicles 102 observe the same scene and analyze it, the vehicles 102 may identify an object of interest with a higher confidence than if only one vehicle 102 were to analyze the object. The vehicles 102 are able to combine the compute resources and avoid the high latency offload to the cloud.

In an implementation, the vehicles 102 use concepts of cascaded networks to split the processing of different layers in a neural network across compute nodes. The compute nodes may be on different vehicle platforms or roadside infrastructure in close proximity to each other. The decision to share data between compute nodes or platforms may be made at each layer to reduce transmission overhead.

In an implementation, the compute nodes use a high bandwidth and low latency communication technology, such as 5G. The faster short-range communication outweighs the overhead of longer-range communication to the cloud, even after factoring in splitting the processing across several nodes. For instance, an extremely fast exchange of metadata (approximately 2 ms per two-way exchange) over mmWave may be used to set up the larger transfer to the next later on another vehicle.

While proximity between vehicles 102 is an important variable used in the decision to distribute the neural network (NN) layer, other factors may also be used. These factors may include: 1) whether a proposed target vehicle 102 will be in range long enough to complete the computational subtask; 2) the current workload of the proposed target vehicle 102; 3) the quality of network communication between the source vehicle 102 and the proposed target vehicle 102; 4) orientation stability between the source vehicle 102 and proposed target vehicle 102; or 5) platform capabilities of the proposed target vehicle 102.

Orientation stability refers to whether the sensor perspectives of the proposed target vehicle 102 are in flux or relatively constant. For instance, if the proposed target vehicle 102 is turning a corner, the stability of front-facing cameras on the proposed target vehicle 102 are not stable. Relying on data from such sensors may not be reliable or have useful data.

In general, neural network (NN) processing is split among two or more vehicles 102 that are in close proximity to one another. Close proximity in this context may be any distance from a few feet to several hundred yards, depending on the communication standard used and other factors.

Communication between vehicles 102 is vehicle-to-vehicle (V2V) or may involve an intermediary device, such as a router or repeater, and in such case be considered vehicle-to-infrastructure (V2I) or just a different way of performing V2V communication. Using distributed NN processing, the available resources are used more efficiently, and performance of latency-sensitive on-vehicle compute applications is increased. Additionally, using multiple vehicles 102 may provide additional sensor information to better analyze the environment or situation.

Figure 2:
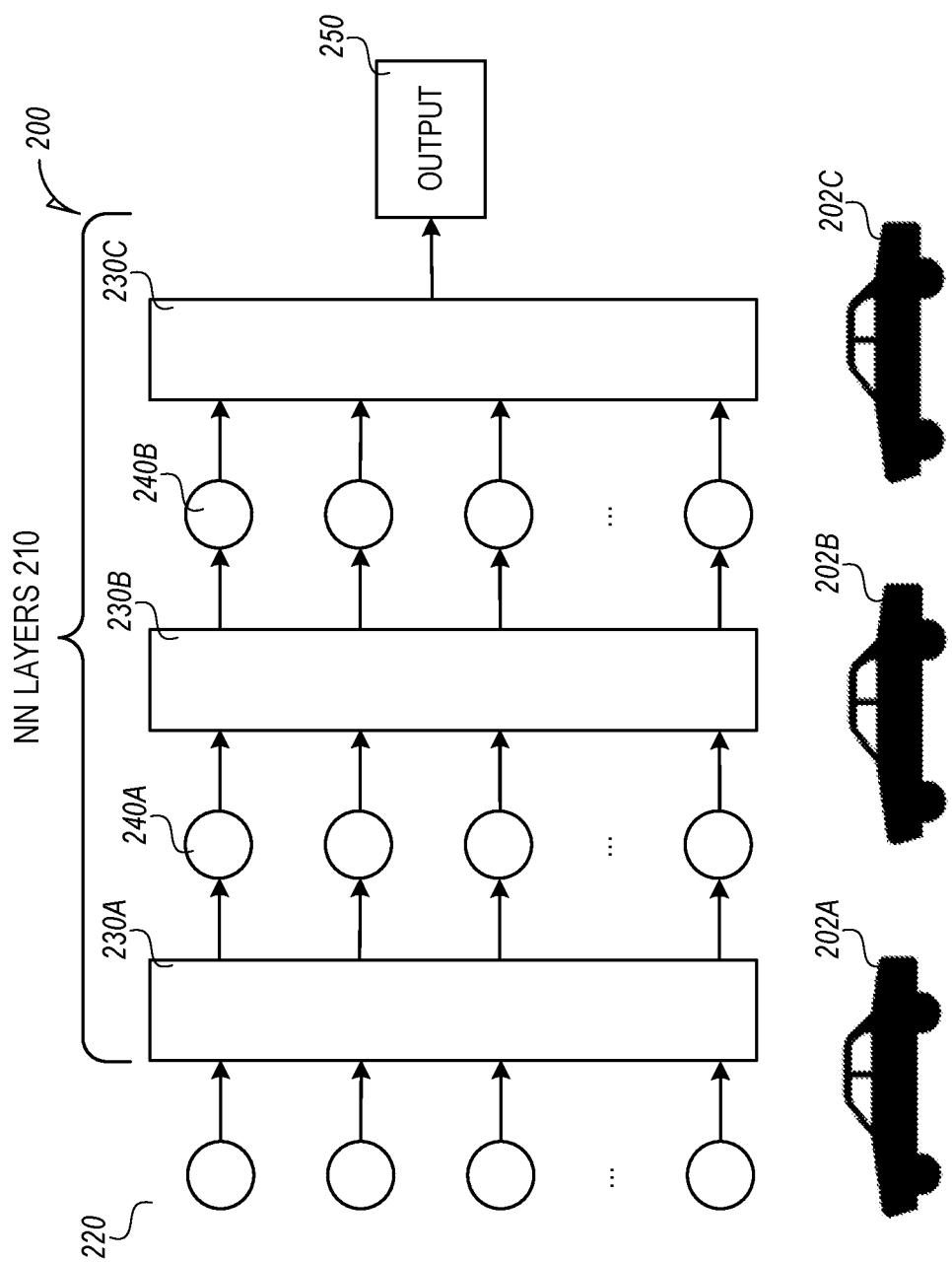
FIG. 2 is a schematic diagram illustrating a distributed neural network in an operating environment, according to an embodiment.

FIG. 2 is a schematic diagram illustrating a distributed neural network 200 in an operating environment according to an embodiment. An initiator vehicle 202A includes a distributed neural network 200. The distributed neural network 200 receives sensor data 220 from sensors as input. The distributed neural network 200 includes multiple layers 210, which may include hidden layers. The distributed neural network takes the input from the sensors and generates an output 250. In an example, the distributed neural network may provide object identification based on the sensor data 220. The distributed neural network may include various layers of neurons 240A and 240B and accumulators 230A, 230B, and 230C.

In an example, the distributed neural network is a cascaded neural network. The sensor data 220 may be provided to each of the layers 210 in this example. Each layer 210 of the trained cascaded neural network identifies a feature that is used to determine the output. In an example, layers 210 within the cascaded neural network may be distributed across vehicles 202A-C. In an example, the same trained cascaded neural network is available locally in multiple vehicles 202A-C. In this example, an evaluating vehicle (e.g., 202A) may evaluate any layer of the cascaded neural network. To evaluate the layer, the evaluating vehicle 202A-C is provided with the input from the sensors and input from the previous layer if there is a previous layer. The evaluating vehicles 202A-C may evaluate the intended layer and provide the results back to the initiator vehicle or to another vehicle 202A-C.

In another example, the initiator vehicle 202A includes a neural network that was trained with sensor data from sensors in different positions. For example, data from a forward camera from a vehicle, such as 102A, and data from a second forward camera from a vehicle behind and in an adjacent lane, such as vehicle 102B, may be used an input to the neural network. The neural network is trained to take advantage of combining the data from both forward cameras from different vehicles. One such advantage is more accurate object detection. Another advantage is with audio beamforming that uses microphones from the different vehicles. Audio beamforming allows a source of a sound to be calculated from the sound recorded from the multiple microphones. In some examples, the vehicle 102A could request that vehicle 102B move to a position such that the neural network may be used. If there are no suitable vehicles, the initiator vehicle 202A may use a different neural network that does not use input from a second vehicle.

In another example, the neural networks are not shared among the vehicles 202A-C. Instead, the initiator vehicle 202A may provide the number of nodes in a layer, activation functions, and the weights for each of these nodes to the vehicle that will execute that layer, e.g., vehicles 202B or 202C.

Once a layer is executed, the output of that layer may be forwarded to the vehicle that is executing the next layer, which uses the output of the current layer as input. In an example, the output may be sent to the initiator vehicle 202A that determines either to execute the next layer locally or sends the output to a different vehicle. In another example, as part of the messaging between vehicles, the identifier of the next vehicle is provided. For example, vehicle 202B may execute a layer and be provided with an identifier corresponding to vehicle 202C. Upon completion of executing its assigned layer, the vehicle 202B may send the output to the vehicle 202C. If the vehicle 202C is not able to receive the output, the vehicle 202B may send the output back to the initiator vehicle 202A. The initiator vehicle 202A may then use the output to continue to execute the neural network.

Figure 3:
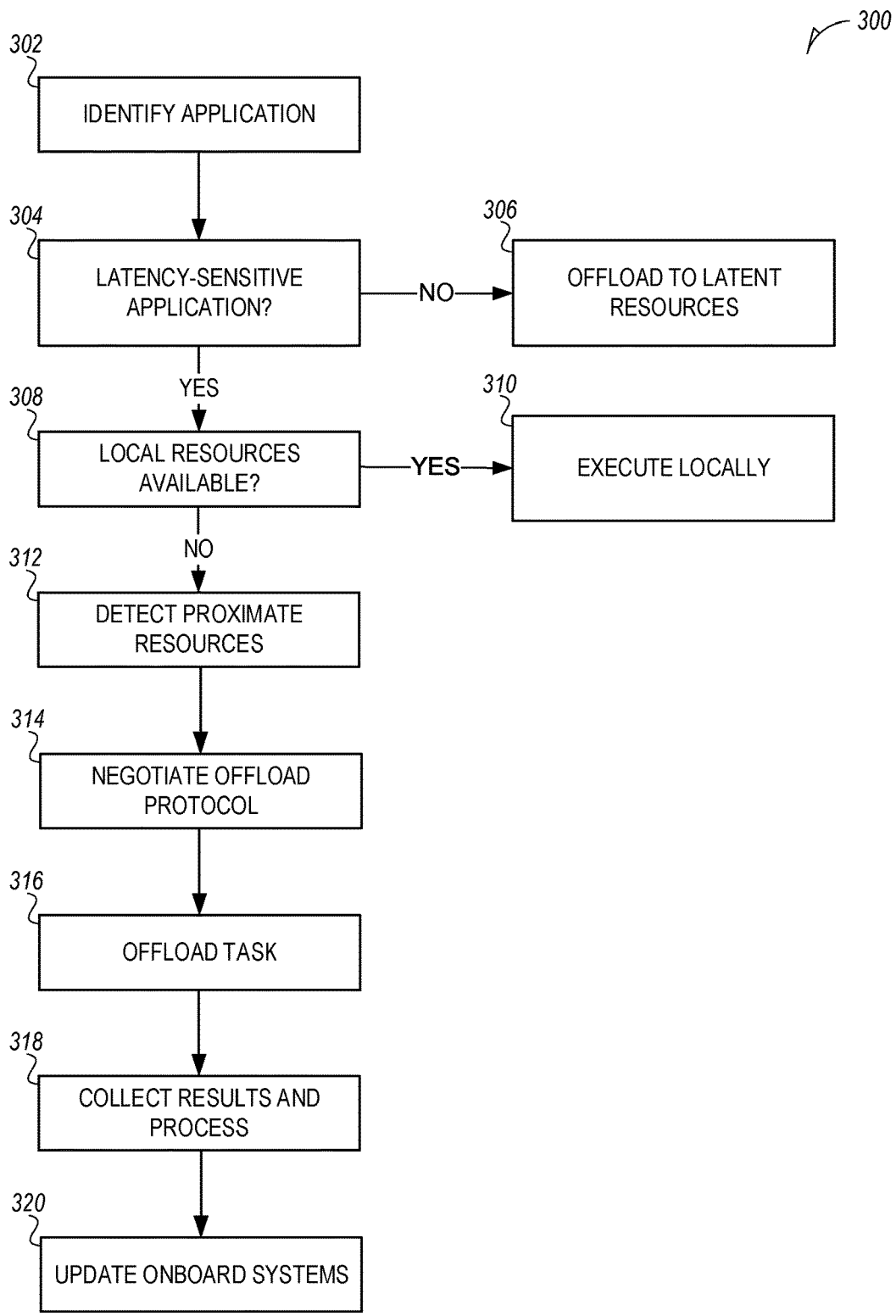
FIG. 3 is a flowchart illustrating a process for managing distributed neural network processing in a vehicle swarm, according to an embodiment.

FIG. 3 is a flowchart illustrating a process 300 for managing distributed neural network processing in a vehicle swarm, according to an embodiment. The vehicle swarm may include two or more vehicles. The initiator vehicle, also referred to as a host vehicle, ego vehicle, or primary vehicle, is the vehicle that executes the process 300.

At 302, an application is identified at the initiator vehicle. For example, an object identification application may be identified by a component of the onboard systems. Other examples of applications include, route planning, object location prediction, object movement prediction, etc. In various examples, the application includes a neural network that is executed as part of the application. This neural network may be distributed to remote resources such as cloud resources, proximate vehicles resources, etc. At 304, it is determined whether the application is a latency-sensitive application. If the application is not a latency-sensitive application, then the vehicle may offload the application's execution to latent resources, such as resources in a cloud computing environment (operation 306). In an example, the latency of the latent resources may be determined based on the communication costs and processing costs. If the latency of application may be met by the latent resources, then the latent resources may be used.

If instead, the application is a latency-sensitive application, then cloud offload may incur too much latency and local execution either on-vehicle or between-vehicles is used. Alternatively, local resources may be queried prior to the latent resources. If the local resources are able to process the application, then the application may be executed locally.

At 308, it is determined whether the initiator vehicle has sufficient resources available to execute the latency-sensitive application in an acceptable amount of time. The acceptable time may be defined using one or more policies. The policies may be implemented as service level agreement (SLA) between a compute element and a data consumer requesting the computed data in the initiator vehicle.

If the initiator vehicle has sufficient resources to execute the latency-sensitive application in an acceptable time, then local execution on the initiator vehicle is performed (operation 310).

If instead, the initiator vehicle does not have sufficient resources, then the initiator vehicle detects vehicles in proximity (operation 312). A data structure and protocol may be used to describe the position and orientation of the initiator vehicle's platforms and sensors. A discovery protocol may be used to exchange information about a subject vehicle (e.g., compute resources, storage resources, platform type or capabilities, etc.), the latency-sensitive application, performance policies, data handling policies, or the like, with other vehicles in proximity to the initiator vehicle.

At 314, an offload protocol is negotiated with discovered vehicles. The offload protocol may include various aspects, such as a response timeout period, a communication protocol, a data handling or privacy policy, or the like. For instance, depending on the state of a particular vehicle (e.g., moving or parked), a communication protocol and data exchange protocol are determined. Vehicles that are moving may require use of a high-speed communication protocol to ensure that the results are able to be passed back to the initiator vehicle before the secondary vehicle is out of range.

At 316, the application parameters, data, neural network weights, activation functions, or other information is shared to secondary vehicles in proximity to the initiator vehicle, which are able to assist in processing. In an example, the information shared describes a layer of the neural network of the application. The secondary vehicle, therefore, is able to create and execute the layer of the neural network based on the shared data. In another example, the initiator and secondary vehicles contain the same neural network for the application. In this case, the data shared from the initiator vehicle may be reduced as the neural network weights and activation functions are already known by the secondary vehicle.

At 318, results are collected and processed at the initiator vehicle. For example, the secondary vehicle may execute a layer of the neural network and return the output to the initiator vehicle. The initiator vehicle may then execute other layers of the neural network or use the output as the output of the neural network. The initiator vehicle may return to operation 312 and detect vehicles in proximity to offload intermediate results to proximate vehicles for further processing. The output of an intermediate layer is known as embedding, which may be considered a form of feature extraction. Often the dimensionality of embedding is much lower than the raw data and contains semantically relevant information for the classification task. It is bandwidth-efficient to send a well-chosen embedding for offloading. The system here may evaluate the neural network at various stages before offloading so that the processing may be terminated at intermediate layers in case the solution is not converging to a definite result. Such mechanisms reduce resources by avoiding unnecessary data transmission and computations.

At 320, the results of the processing are used in a component (e.g., application, sensor, subsystem, etc.) of the initiator vehicle. For example, the result of the application may be a more efficient route which may be provided to the ADAS system. In another example, the result of the application is detection of an object. This result may be provided to the ADAS system or the autonomous ADAS system. Any detected object, therefore, may be taken into account accordingly.

Figure 4:
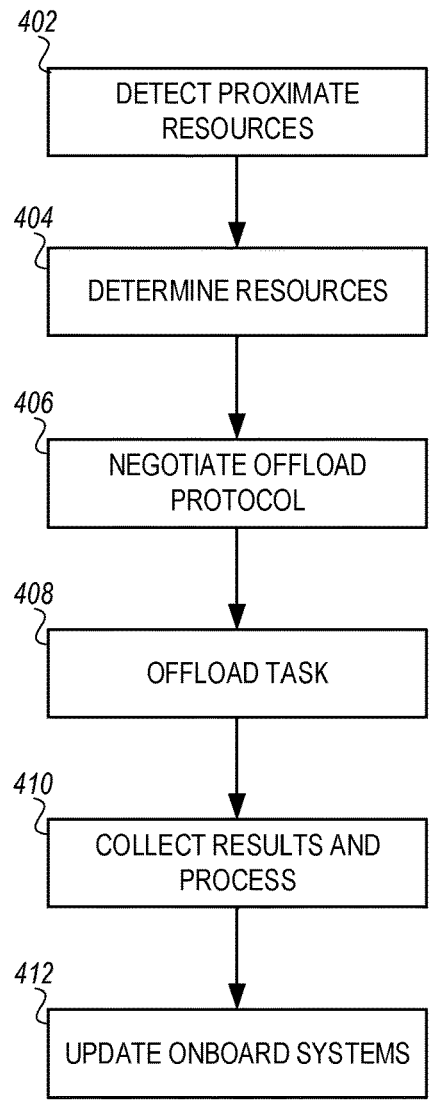
FIG. 4 is a flowchart illustrating a process for offloading neural network workloads to proximate vehicles, according to an embodiment.

FIG. 4 is a flowchart illustrating a process 400 for offloading neural network workloads to proximate vehicles, according to an embodiment. In an example, the neural network processor (e.g., NN co-processor 120) determines how to execute a trained neural network of an application. Once the onboard systems determine that the neural network should be executed with proximate resources, the neural network processor determines the proximate resources to use and then distributes the neural network workload to those proximate resources. Proximate resources may include resources from nearby vehicles, resources from nearby infrastructure, or both.

At 402, the neural network processor detects proximate resources. In an example, the neural network processor may control a communication system to broadcast a neural network offload discovery packet. In some examples, known V2V or V2I communication messages are used to detect proximate vehicles. The neural network processor may use additional information to determine which proximate resources to use. A resource is considered proximate if the resource is close enough to communicate with the initiator vehicle. In various examples, the neural network processor may provide various discovery parameters to proximate resources.

Figure 5:
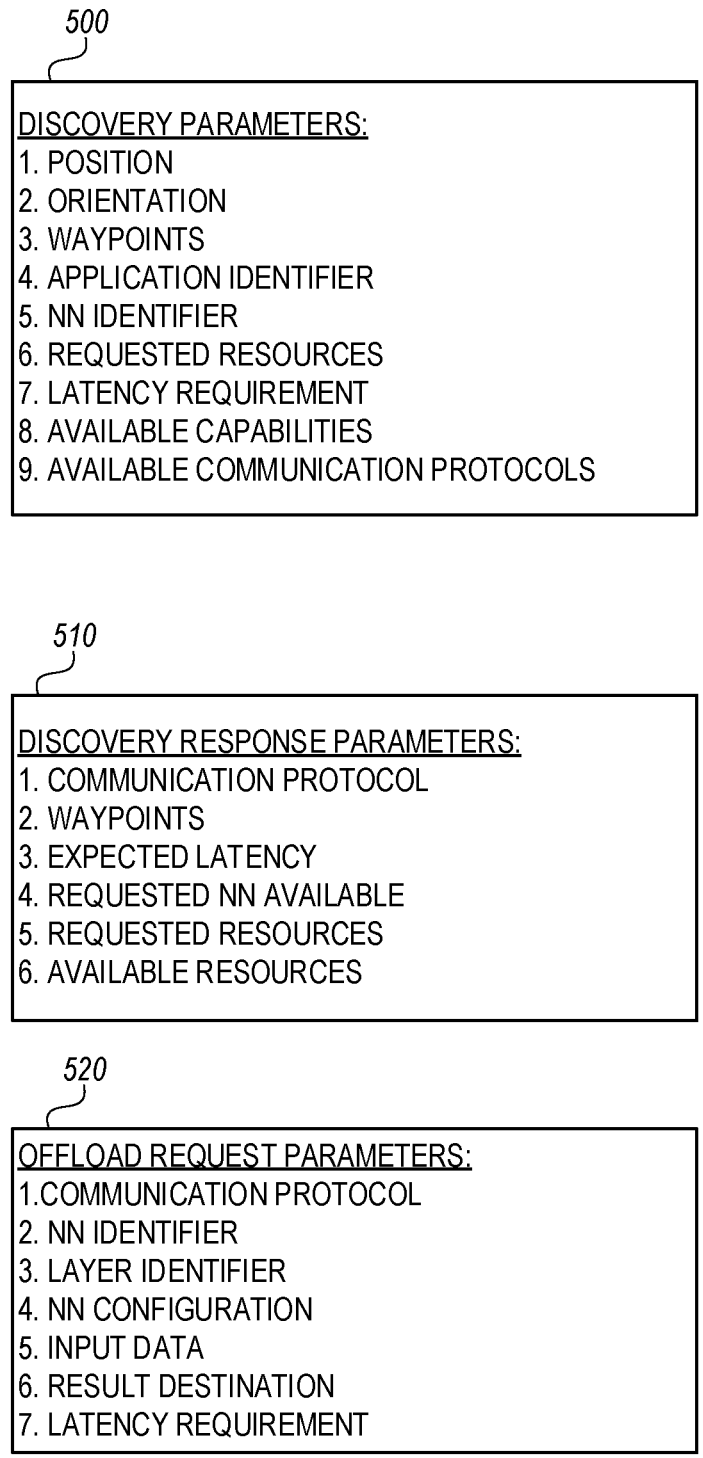
FIG. 5 illustrates the parameters of a neural network workload discovery process, according to an embodiment.

FIG. 5 illustrates parameters of a neural network workload discovery process, according to an embodiment. Discovery parameters 500 may be used to prompt proximate resources to respond with discovery response parameters 510. In an example, the neural network processor may determine the neural network for the selected application. The application may be associated with an application identifier. In addition, a trained neural network associated with the application may be stored in both the initiator vehicle and at proximate resources. For example, an object identification neural network may be common and stored in many different vehicles, infrastructure, etc. In this example, the application identifier and the neural network identifier may be included in a discovery message to identify the request neural network. These parameters may be broadcast or sent to proximate resources. In an example, the discovery message is encoded for transmission for transmission. The encoding may include encoding the discovery message for transmission over various wireless standards.

The discovery message may include the latency requirement, such as 200 milliseconds. Proximate resources may determine if the requested workload may be executed and returned within the latency requirement. If the proximate resource determines that the requested workload cannot be done within the latency requirement, the proximate resources may opt to not respond. Alternatively, the proximate resource may respond but with an indication that the neural network workload cannot be completed within the requested latency requirement. In some examples, the discovery response message may include the time that the proximate resource could complete the requested workload. The initiator vehicle may determine that the latency requirement from the proximate resource is acceptable and send the workload with an updated latency requirement that is acceptable to the proximate resource.

Resources receiving the discovery message may respond with one or more discovery response parameters 510. Resources that include the requested neural network may respond that the requested neural network is available at the resource. In this example, data that describes the neural network is not needed to be sent from the initiator vehicle. The resources that include the requested neural network may have a higher priority than other available resources that do not include the requested neural network. Having a common neural network allows for smaller data transmissions and therefore, smaller transmission times.

In some examples, a neural network is trained based on sensor data from multiple sensors that are in different locations. For example, an object detection neural network may be trained using sensor data from different locations. As an example, an object detection neural network may be trained based on sensor data from vehicles approaching a common intersection. In this example, the discovery message may include a requested position that matches the neural network. For example, the discovery message may indicate that a resource with sensor data from 90 degrees of either side of the initiator vehicle is desired. If there are available resources with the requested sensor data, the sensor data may be provided to the proximate resource, such that the proximate resource may run part of a neural network that takes into account sensor data from the initiator vehicle and its own sensor data. Such a neural network may be more accurate since sensor data from different locations and perspectives are used.

As another example, object detection may be based on sensor data from two vehicles moving in the same direction but with one vehicle further ahead. In this example, a neural network may be trained using a first vehicle position and a second vehicle position behind the first vehicle. Relevant sensor data may be sent to one of the vehicles and some or all of the layers of the neural network may be executed. The sensor data may be forward facing from both vehicles, rear facing from both vehicles, or forward facing from one vehicle and rear facing from the other vehicle.

The discovery parameters 500 may also include information regarding the initiator vehicle's current position, orientation, or waypoints. For example, the projected position of the initiator vehicle for a next time period may be provided as waypoints. The next time period may include waypoints for the next 500 milliseconds (ms), 1 second (s), 30 s, 1 minute, etc. A proximate resource may use this information to determine whether or not to respond to the discovery message. For example, a proximate vehicle may determine that the initiator vehicle is moving away, based on the speed of both the proximate vehicle and the initiator vehicle, from the proximate vehicle. In this case, the proximate vehicle may determine to not respond since the proximate vehicle and the initiator vehicle are likely to not be in communication range for long and therefore, the proximate vehicle does not consider itself an available resource. In another example, the discovery parameters do not include any waypoints, and the proximate vehicle may respond with its position, orientation, or waypoints. In this example, the neural network processor may determine if the proximate resources are viable for offloading the neural network workload.

In an example, the neural network processor determines the proximate resources that are traveling to the same waypoints or close by waypoints of the initiator vehicle. In this example, the neural network processor may calculate a predicted amount of time the proximate resource will be in communication range. Proximate resources that will be in range for longer periods of times may be prioritized over proximate resources that will be in range for shorter period of times. For example, the neural network may determine which resources are moving in the same direction, are stationary, or moving away from the initiator vehicle. Resources moving away from the initiator vehicle may be ignored.

Depending on the application and the state of the initiator vehicle, stationary resources may be prioritized over resources moving in the same direction. For example, stationary infrastructure resources may be connected to one another using a high-speed communication protocol. The neural network processor may determine the stationary infrastructure will be available over the initiator vehicle's waypoints. For example, the initiator vehicle may be traveling on an interstate for an extended period. The neural network processor may determine that there are stationary resources that are available along the waypoints using the data from the discovery response message. In this case, the neural network processor may prioritize the stationary resources over resources moving in the same direction. As another example, the initiator vehicle may be stationary. In this example, stationary resources may be prioritized over moving resources.

Waypoints may also be used to determine sensor orientation and sensor transience. If a vehicle is currently turning or will be turning within a time period, the sensor data may not be useful for the neural network. In these instances. The proximate resource or the neural network processor may determine to ignore the discovery message or the proximate resource, respectively.

The discovery message may also include an indication of the requested resources. For example, an indication that three layers of an n-node neural network is being requested. A proximate resource may respond with an indication of how many layers the proximate resource may executed within the provided latency requirement. This information may be provided if the initiator is not requesting a workload from a known neural network or would like to use resources that do not include the known neural network.

The discovery response message may include an expected latency value. The expected latency value is an estimate of the latency that the proximate resource may execute the requested resources.

The discovery message may also include available resources at the initiator vehicle. If a proximate resource could use any of the available resources, the proximate resource may indicate the useful resources in the discovery response message. The initiator vehicle may prioritize resources that may use local resources. Sharing resources allows the communication link to be shared and avoids having to setup a second communication link with another resource.

The discovery response message may also include parameters describing the resources available at the proximate resource. For example, an indication of how much processing power, storage, etc., are available. This information may be used by the neural network processor at the initiator vehicle to determine how to distribute the neural network workloads.

Returning to FIG. 4, at 404, the neural network processor determines the resources to use to execute the neural network. The parameters from the discovery response messages may be used to prioritize the available resources. The discovery response may be encoded for transmission over various wireless standards. Accordingly, the discovery response may be decoded by the initiator vehicle. In an example, the neural network processor determines the proximate resources with the smallest amount of expected latency, including using any available local resources. For example, the neural network processor may sort the proximate resources by the expected latency and select the resources with the smallest amount of expected latency. The resources that are determined to execute the neural network the fastest may be used. In another example, the neural network processor determines a length of time that the proximate resources that will be proximate, e.g., an expected duration of proximity. The resources may be sorted based on the expected duration of proximity. The proximate resources with longer expected durations may be prioritized based on expected latency, and the workloads needed to execute the neural network may be offloaded.

In some examples, a proximate resource that is in a position needed by the application's neural network is selected. In this example, the initiator vehicle may provide the sensor data that is used as input for the neural network to the proximate resource. In another example, the initiator vehicle receives sensor data from the proximate resource that is used as input for the neural network. Subsequent layers may be offloaded to the proximate resource, and the eventual output may be shared between the initiator vehicle and the proximate resource. Both the initiator vehicle and the proximate resource, therefore, may take advantage of the neural network output as well as distribute the execution of the neural network.

In another example, the discovery message indicates the desired workload and the requirements of that workload, e.g., specific neural network, required latency, etc. Any proximate resource that responds to this type of discovery message indicates that the proximate resource is available and may be used to execute the requested workload.

At 406, the neural network processor negotiates the offloading of workloads to the identified proximate resources. Offload request parameters 520 may be used to indicate a specific workload that is to be executed. In an example, the offload request parameters 520 are included in an offload request message. The offload request message may be sent addressed to the proximate resource. The offload request message may also include the communication protocol to use and any relevant parameters for the selected communication protocol.

The offload request parameters 520 may include application parameters, input data for a neural network layer, node weights, activation functions, etc., such that the proximate resource may instantiate the desired layer of the neural network and then execute that layer. In another example, the workload to be executed is not a layer but rather one or more nodes within a neural network. In this example, the data required to instantiate the node and calculate its output is included in the offload request parameters 520.

Proximate resources may respond to the offload request message with a 'yes' or 'no' indication that indicates if the proximate resource agrees to execute the workload within the desired latency. At 408, the neural network processor offloads the workloads to the proximate resources that affirmatively responded to the offload request. At 410, the results from the execution by the proximate resources are collected by the neural network processor. The neural network processor may then further process the received data as needed. For example, a final layer of the neural network may be executed by the neural network processor. At 412, the neural network processor provides the output of the neural network to a component of the onboard systems. For example, the neural network processor may provide the results of an object detection neural network to the ADAS system. The ADAS system may then take action based upon the detected object. For example, in an autonomous mode, the ADAS system may take an action to avoid the detected object when the detected object is within the initiator vehicle's current path.

Figure 6:
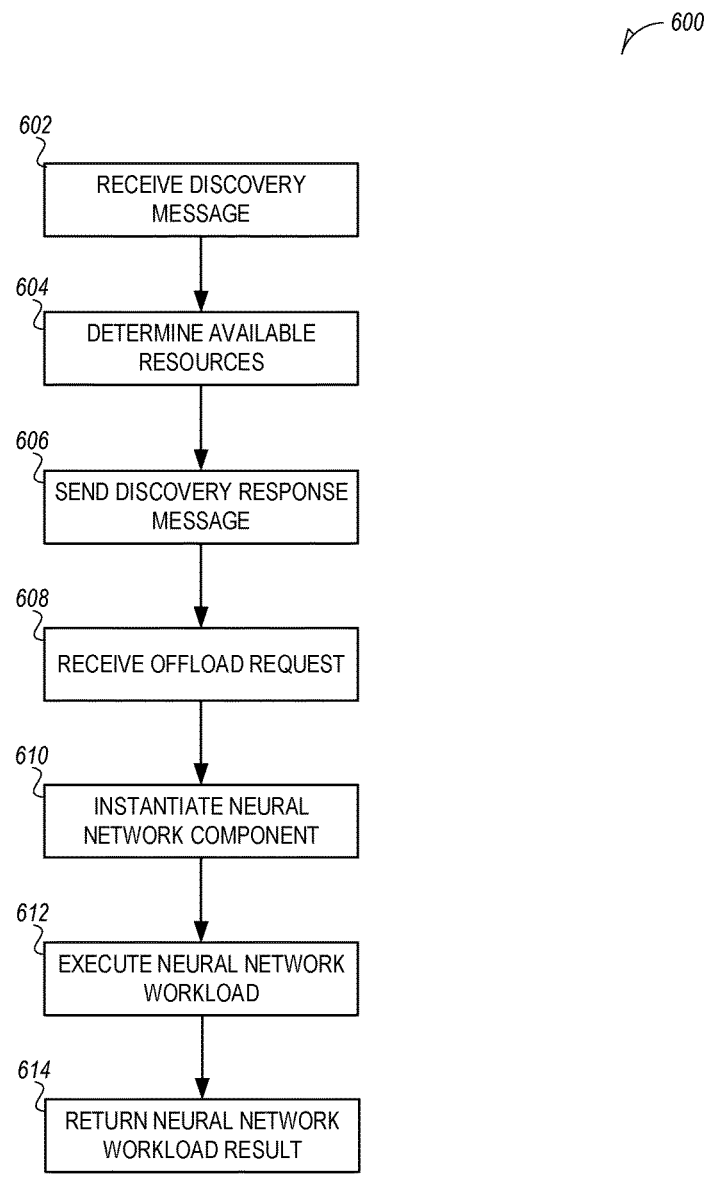
FIG. 6 is a flowchart illustrating a process for executing a neural network workload, according to an embodiment.

FIG. 6 is a flowchart illustrating a process 600 for executing a neural network workload, according to an embodiment. At 602, a discovery message is received by a proximate resource from an initiator vehicle. The discovery message may include one or more discovery parameters 500. The discovery message may indicate the type of neural network workload that is being requested. At 604, the proximate vehicle determines if there are resources available to execute the requested workload within the provided latency.

In an example, the discovery message includes a trained neural network identifier. The proximate vehicle may determine if the trained neural network is stored locally. For example, there may be a trained neural network for object detection that is shared among a group of vehicles. In addition, the trained neural network may be associated with sensor positions. The sensor positions may include a sensor position on the initiator vehicle and another sensor position for a sensor on the proximate vehicle. For example, a neural network may be trained based on the sensors being offset from one another by a distance.

In an example, the proximate resource is a vehicle. Onboard systems, such as a neural network processor, may determine that the proximate vehicle is not currently in the correct position from the initiator vehicle. Onboard systems of the proximate vehicle may then determine if the proximate vehicle is able to move to the correct position for the requested neural network. The onboard systems, such as the neural network processor, may cause the proximate vehicle to navigate to the correct position.

In addition, the neural network processor may determine the availability of any unused resources available at the proximate resource. The neural network processor may determine an amount of local resources that should remain free for use by the proximate resource. Any remaining resources may be made available for offloading of neural network workloads. Once the amount of available resources are determined, the neural network processor may determine if the available resources are able to execute the requested neural network workload within the requested latency requirement.

At 606, the neural network processor may cause a discovery response message to be transmitted to the initiator vehicle. The discovery response message may indicate that the proximate resource has available resources to execute the requested neural network workload. In addition, the discovery response message may indicate the position of the proximate resource.

At 608, an offload request is received. In an example, the offload request includes properties that describe the neural network workload that is to be executed. For example, type of neural network, the number of nodes, the weights of each node, the activation functions of the nodes, etc., may be received. These properties are used to instantiate the desired neural network component. The neural network component may be one or more nodes of a layer, a single layer, or multiple layers of the neural network.

In an example, the proximate resource may respond with an acknowledgement that the offload request has been accepted. In addition, the proximate resource may finish moving into a desired position and send an acknowledgement once the proximate resource has navigated to a position such that the proximate resource's sensor may be input in the requested neural network workload.

At 612, once instantiated, the input received from the initiator vehicle is applied to the instantiated neural network component. At 614, the result of the neural network component is returned. The result may be returned to the initiator vehicle or directed to another proximate resource that will use the result.

One example of distributing the workload of a neural network is a parking structure application that determines free spaces within the parking structure. In this example, a neural network is trained to take sensor input, such as image data, radar data, LiDAR data, sonar data, etc., and determine if there is an object within a parking space. The neural network may be shared with the vehicles within the parking structure. In an example, a vehicle may request the neural network or is sent the neural network after reporting the vehicle does not have the neural network. In an example, a stationary resource within the parking structure is available and provides the neural network as needed.

As each vehicle has the neural network, the neural network processor of a vehicle may determine what other vehicles are proximate. In some examples, the battery level used to power onboard systems is used to determine if a vehicle will process any of the neural network workloads. Vehicles that have available resources may be assigned to one layer or one or more nodes of the neural network. One of the vehicles executes the first layer of the neural network, and therefore, receives sensor data from different vehicles. For each vehicle that provides sensor data, the neural network is ran and if an adjacent parking space is open is determined.

In addition, the output of the neural network may be combined with global positioning system information to generate a map of the parking structure. In an example, gaps in areas within the parking structure are determined. For example, an area of consecutive parking spots that do not contain any vehicles will be a gap in the map of the parking structure. An autonomous vehicle may be directed to this gap to provide the missing information. In addition, the autonomous vehicle may be rerouted to its original position after collecting sensor data from the gap area.

In addition, the results of the available parking spaces may be provided to an application server that provides this information to vehicles that are proximate to the parking structure and looking to park.

Another example if using combined video data from the vehicles within the parking structure to identify suspicious activity. The video data may also be combined with other available sensor data, such as audio, radar, LiDAR, etc. In this example, a neural network is trained to detect suspicious activity. Using video, potentially of the same scene, from different vehicles allows for richer video analysis and better accuracy in detecting suspicious activities. If any suspicious activities are detected, a warning may be sent via the communication system of a vehicle to alert security.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 7:
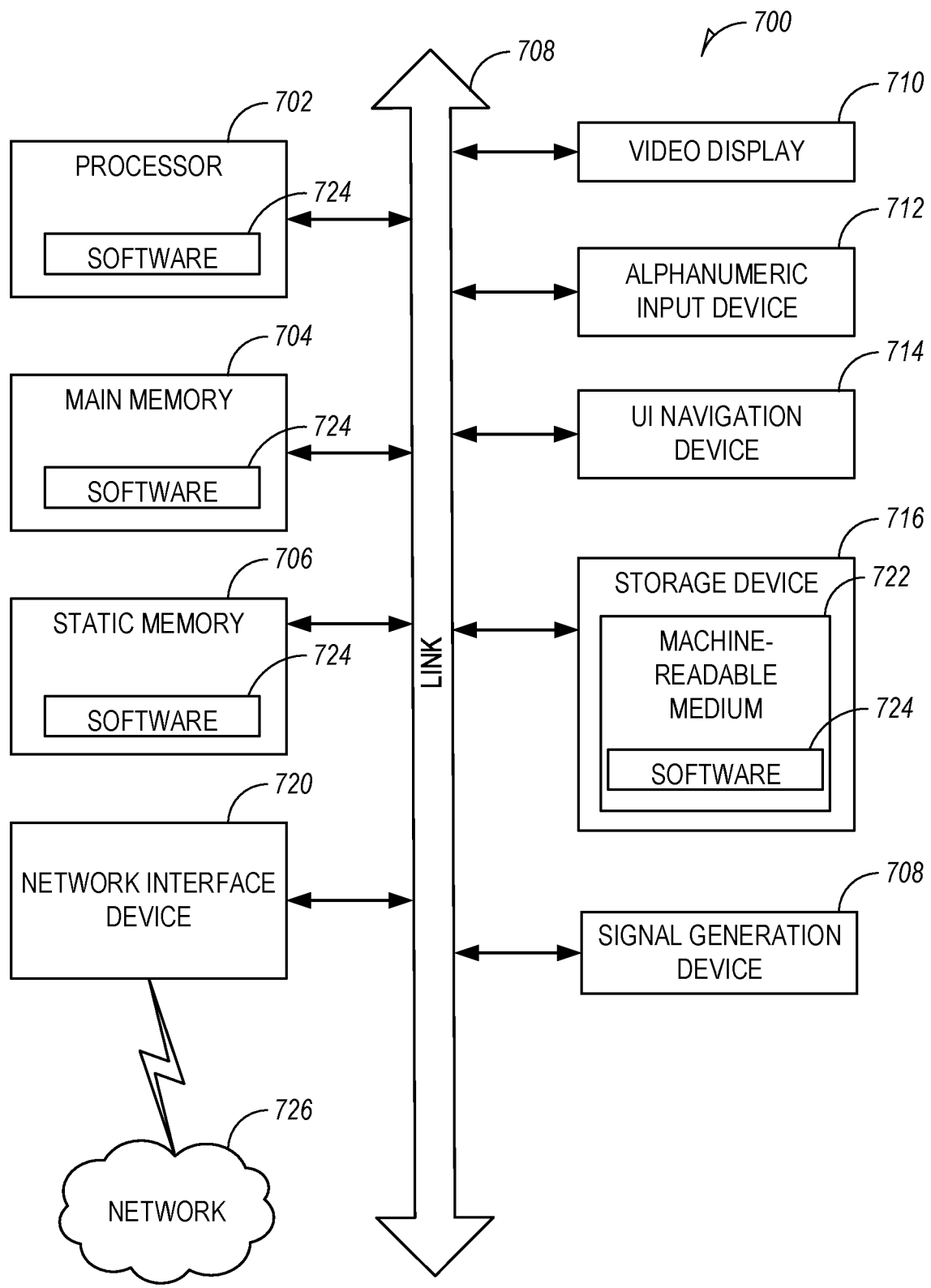
FIG. 7 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hardwired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 7 is a block diagram illustrating a machine in the example form of a computer system 700, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, a wearable device, a vehicle subsystem, a personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, gyrometer, magnetometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a neural network workload distribution system, the system comprising: a neural network processor of a vehicle to: receive an indication of an application to execute, the application comprising a neural network and a latency requirement, wherein the neural network comprises a node; encode a discovery message comprising the latency requirement and requested resources for a workload of the neural network; decode, from a proximate resource and in response to the discovery message, a discovery response comprising available resources of the proximate resource available for the workload based on the requested resources for the workload; select the proximate resource to execute the workload based on the available resources of the proximate resource; encode, in response to the discovery response, an offload request comprising a description of the workload, wherein the description of the workload identifies the node to execute at the proximate resource; decode, in response to the offload request, a result of the workload; and provide the response to an ADAS system.

In Example 2, the subject matter of Example 1 includes, wherein the description of the workload comprises a node weight of the node and an activation function of the node.

In Example 3, the subject matter of Examples 1-2 includes, wherein the description of the workload comprises a layer of the neural network, a number of nodes in the layer, nodes weights for each node in the layer, and activation functions for each node in the layer, wherein the node is in the layer.

In Example 4, the subject matter of Examples 1-3 includes, a processor to determine the latency requirement; and determine local resources of the vehicle are not enough to execute the application within the latency requirement.

In Example 5, the subject matter of Examples 1-4 includes, an onboard sensor to provide sensor data, wherein the discovery message comprises the sensor data, and wherein the sensor data is input to the neural network.

In Example 6, the subject matter of Examples 1-5 includes, wherein discovery response includes waypoints of the proximate resource.

In Example 7, the subject matter of Example 6 includes, wherein the neural network processor is configured to determine a time period that the proximate resource is proximate to the vehicle based on the waypoints, and wherein the proximate resource is selected based on the time period.

In Example 8, the subject matter of Examples 6-7 includes, wherein the neural network is trained with first sensor data from a first position and second sensor data from a second position, wherein sensor data of the vehicle is within the first position.

In Example 9, the subject matter of Example 8 includes, wherein the discovery message comprises an indication of the second position.

In Example 10, the subject matter of Examples 8-9 includes, wherein the neural network processor is configured to determine sensor data of the proximate resource is within the second position, and the proximate resource is selected based on the sensor data of the proximate resource being within the second position.

In Example 11, the subject matter of Examples 1-10 includes, wherein the discovery message comprises position and orientation of the vehicle, and wherein the proximate resource has the same orientation as the vehicle.

In Example 12, the subject matter of Examples 1-11 includes, wherein the neural network processor is configured to: decode multiple discovery responses from multiple proximate resources; and sort the multiple proximate resources by an expected latency, wherein the proximate resource is selected based on the expected latency.

In Example 13, the subject matter of Examples 1-12 includes, wherein the neural network processor is configured to: decode multiple discovery responses from multiple proximate resources; determine, for each of the multiple proximate resources, an expected length of proximity; and sort proximate resources by an expected length of proximity, wherein the proximate resource is selected based on the length of proximity.

In Example 14, the subject matter of Examples 1-13 includes, the system further comprises the ADAS system, wherein the neural network is an object detection neural network, and the ADAS system is configured to change navigation based on output of the object detection neural network.

Example 15 is a method distributing a neural network workload, the method comprising operations performed using a neural network processor, the operations comprising: receiving an indication of an application to execute, the application comprising a neural network and a latency requirement, wherein the neural network comprises a node; encoding a discovery message comprising the latency requirement and requested resources for a workload of the neural network; decoding, from a proximate resource and in response to the discovery message, a discovery response comprising available resources of the proximate resource available for the workload based on the requested resources for the workload; selecting the proximate resource to execute the workload based on the available resources of the proximate resource; encoding, in response to the discovery response, an offload request comprising a description of the workload, wherein the description of the workload identifies the node to execute at the proximate resource; decoding, in response to the offload request, a result of the workload; and providing the response to an ADAS system.

In Example 16, the subject matter of Example 15 includes, wherein the description of the workload comprises a node weight of the node and an activation function of the node.

In Example 17, the subject matter of Examples 15-16 includes, wherein the description of the workload comprises a layer of the neural network, a number of nodes in the layer, nodes weights for each node in the layer, and activation functions for each node in the layer, wherein the node is in the layer.

In Example 18, the subject matter of Examples 15-17 includes, wherein the operations further comprise determining the latency requirement; and determining local resources of the vehicle are not enough to execute the application within the latency requirement.

In Example 19, the subject matter of Examples 15-18 includes, wherein the operations further comprise receiving sensor data from an onboard sensor, wherein the discovery message comprises the sensor data, and wherein the sensor data is input to the neural network.

In Example 20, the subject matter of Examples 15-19 includes, wherein discovery response includes waypoints of the proximate resource.

In Example 21, the subject matter of Example 20 includes, wherein the operations further comprise determining a time period that the proximate resource is proximate to the vehicle based on the waypoints, and wherein the proximate resource is selected based on the time period.

In Example 22, the subject matter of Examples 20-21 includes, wherein the neural network is trained with first sensor data from a first position and second sensor data from a second position, wherein sensor data of the vehicle is within the first position.

In Example 23, the subject matter of Example 22 includes, wherein the discovery message comprises an indication of the second position.

In Example 24, the subject matter of Examples 22-23 includes, wherein the operations further comprise determining sensor data of the proximate resource is within the second position, and the proximate resource is selected based on the sensor data of the proximate resource being within the second position.

In Example 25, the subject matter of Examples 15-24 includes, wherein the discovery message comprises position and orientation of the vehicle, and wherein the proximate resource has the same orientation as the vehicle.

In Example 26, the subject matter of Examples 15-25 includes, wherein the operations further comprise: decoding multiple discovery responses from multiple proximate resources; and sorting the multiple proximate resources by an expected latency, wherein the proximate resource is selected based on the expected latency.

In Example 27, the subject matter of Examples 15-26 includes, wherein the operations further comprise: decoding multiple discovery responses from multiple proximate resources; determining, for each of the multiple proximate resources, an expected length of proximity; and sorting proximate resources by an expected length of proximity, wherein the proximate resource is selected based on the length of proximity.

In Example 28, the subject matter of Examples 15-27 includes, wherein the neural network is an object detection neural network, and wherein the operations further comprise updating navigation based on output of the object detection neural network.

Example 29 is at least one non-transitory machine-readable medium including instructions, the instructions when executed by a neural network processor to distribute a neural network workload, cause neural network processor to perform the operations comprising: receiving an indication of an application to execute, the application comprising a neural network and a latency requirement, wherein the neural network comprises a node; encoding a discovery message comprising the latency requirement and requested resources for a workload of the neural network; decoding, from a proximate resource and in response to the discovery message, a discovery response comprising available resources of the proximate resource available for the workload based on the requested resources for the workload; selecting the proximate resource to execute the workload based on the available resources of the proximate resource; encoding, in response to the discovery response, an offload request comprising a description of the workload, wherein the description of the workload identifies the node to execute at the proximate resource; decoding, in response to the offload request, a result of the workload; and providing the response to an ADAS system.

In Example 30, the subject matter of Example 29 includes, wherein the description of the workload comprises a node weight of the node and an activation function of the node.

In Example 31, the subject matter of Examples 29-30 includes, wherein the description of the workload comprises a layer of the neural network, a number of nodes in the layer, nodes weights for each node in the layer, and activation functions for each node in the layer, wherein the node is in the layer.

In Example 32, the subject matter of Examples 29-31 includes, wherein the operations further comprise determining the latency requirement; and determining local resources of the vehicle are not enough to execute the application within the latency requirement.

In Example 33, the subject matter of Examples 29-32 includes, wherein the operations further comprise receiving sensor data from an onboard sensor, wherein the discovery message comprises the sensor data, and wherein the sensor data is input to the neural network.

In Example 34, the subject matter of Examples 29-33 includes, wherein discovery response includes waypoints of the proximate resource.

In Example 35, the subject matter of Example 34 includes, wherein the operations further comprise determining a time period that the proximate resource is proximate to the vehicle based on the waypoints, and wherein the proximate resource is selected based on the time period.

In Example 36, the subject matter of Examples 34-35 includes, wherein the neural network is trained with first sensor data from a first position and second sensor data from a second position, wherein sensor data of the vehicle is within the first position.

In Example 37, the subject matter of Example 36 includes, wherein the discovery message comprises an indication of the second position.

In Example 38, the subject matter of Examples 36-37 includes, wherein the operations further comprise determining sensor data of the proximate resource is within the second position, and the proximate resource is selected based on the sensor data of the proximate resource being within the second position.

In Example 39, the subject matter of Examples 29-38 includes, wherein the discovery message comprises position and orientation of the vehicle, and wherein the proximate resource has the same orientation as the vehicle.

In Example 40, the subject matter of Examples 29-39 includes, wherein the operations further comprise: decoding multiple discovery responses from multiple proximate resources; and sorting the multiple proximate resources by an expected latency, wherein the proximate resource is selected based on the expected latency.

In Example 41, the subject matter of Examples 29-40 includes, wherein the operations further comprise: decoding multiple discovery responses from multiple proximate resources; determining, for each of the multiple proximate resources, an expected length of proximity; and sorting proximate resources by an expected length of proximity, wherein the proximate resource is selected based on the length of proximity.

In Example 42, the subject matter of Examples 29-41 includes, wherein the neural network is an object detection neural network, and wherein the operations further comprise updating navigation based on output of the object detection neural network.

Example 43 is at least one machine-readable medium including instructions that, when executed by processing circuitry, cause the processing circuitry to perform operations to implement of any of Examples 1-42.

Example 44 is an apparatus comprising means to implement of any of Examples 1-42.

Example 45 is a system to implement of any of Examples 1-42.

Example 46 is a method to implement of any of Examples 1-42.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A neural network workload distribution system, the system comprising:
a neural network processor of a vehicle to:
receive an indication of an application to execute, the application comprising a neural network and a latency requirement, wherein the neural network comprises at least one neural processing node, the at least one neural processing node located among at least one layer of the neural network;
encode a discovery message comprising the latency requirement and requested resources for a workload of the neural network;
decode, from a proximate resource and in response to the discovery message, a discovery response comprising available resources of the proximate resource available for the workload based on the requested resources for the workload;
select the proximate resource to execute the workload based on the available resources of the proximate resource;
encode, in response to the discovery response, an offload request comprising a description of the workload, wherein the description of the workload identifies the neural processing node of the neural network to execute at the proximate resource;
decode, in response to the offload request, a result of executing the workload at the proximate resource; and
provide an input to an advanced driver-assistance system (ADAS) based on the result.

2. The system of claim 1, wherein the description of the workload comprises a node weight of the neural processing node and an activation function of the neural processing node.

3. The system of claim 1, wherein the description of the workload comprises a layer of the neural network, a number of neural processing nodes in the layer, node weights for each neural processing node in the layer, and activation functions for each neural processing node in the layer, wherein the neural processing node is located in the layer.

4. The system of claim 1, further comprising a hardware processor to:
determine the latency requirement; and
determine local resources of the vehicle are not enough to execute the application within the latency requirement.

5. The system of claim 1, further comprising an onboard sensor to provide sensor data, wherein the discovery message comprises the sensor data, and wherein the sensor data is input to the neural network.

6. The system of claim 1, wherein the discovery response includes waypoints of the proximate resource.

7. The system of claim 6, wherein the neural network processor is configured to determine a time period that the proximate resource is proximate to the vehicle based on the waypoints, and wherein the proximate resource is selected based on the time period.

8. The system of claim 6, wherein the neural network is trained with first sensor data from a first position and second sensor data from a second position, wherein sensor data of the vehicle is within the first position.

9. The system of claim 8, wherein the discovery message comprises an indication of the second position.

10. The system of claim 8, wherein the neural network processor is configured to determine sensor data of the proximate resource is within the second position, and the proximate resource is selected based on the sensor data of the proximate resource being within the second position.

11. The system of claim 1, wherein the discovery message comprises position and orientation of the vehicle, and wherein the proximate resource has the same orientation as the vehicle.

12. The system of claim 1, wherein the neural network processor is configured to:
    decode multiple discovery responses from multiple proximate resources; and
    sort the multiple proximate resources by an expected latency, wherein the proximate resource is selected based on the expected latency.

13. The system of claim 1, wherein the neural network processor is configured to:
    decode multiple discovery responses from multiple proximate resources;
    determine, for each of the multiple proximate resources, an expected duration of proximity; and
    sort proximate resources by the expected duration of proximity, wherein the proximate resource is selected based on the duration of proximity.

14. The system of claim 1, the system further comprises the ADAS system, wherein the neural network is an object detection neural network, and the ADAS is configured to provide vehicle control based on output of the object detection neural network.

15. A method for distributing a neural network workload, the method comprising operations performed using a neural network processor of a vehicle, the operations comprising:
    receiving an indication of an application to execute, the application comprising a neural network and a latency requirement, wherein the neural network comprises at least one neural processing node, the at least one neural processing node located among at least one layer of the neural network;
    encoding a discovery message comprising the latency requirement and requested resources for a workload of the neural network;
    decoding, from a proximate resource and in response to the discovery message, a discovery response comprising available resources of the proximate resource available for the workload based on the requested resources for the workload;
    selecting the proximate resource to execute the workload based on the available resources of the proximate resource;
    encoding, in response to the discovery response, an offload request comprising a description of the workload, wherein the description of the workload identifies the neural processing node of the neural network to execute at the proximate resource;
    decoding, in response to the offload request, a result of executing the workload at the proximate resource; and
    providing an input to an advanced driver-assistance system based on the result.

16. The method of claim 15, wherein the description of the workload comprises a node weight of the neural processing node and an activation function of the neural processing node.

17. The method of claim 15, wherein the description of the workload comprises a layer of the neural network, a number of neural processing nodes in the layer, node weights for each neural processing node in the layer, and activation functions for each neural processing node in the layer, wherein the neural processing node is located in the layer.

18. The method of claim 15, wherein the operations further comprise:
    determining the latency requirement; and
    determining local resources of the vehicle are not enough to execute the application within the latency requirement.

19. The method of claim 15, wherein the operations further comprise receiving sensor data from an onboard sensor, wherein the discovery message comprises the sensor data, and wherein the sensor data is input to the neural network.

20. The method of claim 15, wherein the discovery response includes waypoints of the proximate resource.

21. The method of claim 20, wherein the operations further comprise determining a time period that the proximate resource is proximate to the vehicle based on the waypoints, and wherein the proximate resource is selected based on the time period.

22. At least one non-transitory machine-readable medium including instructions, the instructions when executed by a neural network processor to distribute a neural network workload, cause the neural network processor to perform the operations comprising:
    receiving an indication of an application to execute, the application comprising a neural network and a latency requirement, wherein the neural network comprises at least one neural processing node, the at least one neural processing node located among at least one layer of the neural network;
    encoding a discovery message comprising the latency requirement and requested resources for a workload of the neural network;
    decoding, from a proximate resource and in response to the discovery message, a discovery response comprising available resources of the proximate resource available for the workload based on the requested resources for the workload;
    selecting the proximate resource to execute the workload based on the available resources of the proximate resource;
    encoding, in response to the discovery response, an offload request comprising a description of the workload, wherein the description of the workload identifies the neural processing node of the neural network to execute at the proximate resource;
    decoding, in response to the offload request, a result of executing the workload at the proximate resource; and
    providing an input to an advanced driver-assistance system based on the result.

23. The at least one non-transitory machine-readable medium of claim 22, wherein the description of the workload comprises a node weight of the neural processing node and an activation function of the neural processing node.

24. The at least one non-transitory machine-readable medium of claim 22, wherein the description of the workload comprises a layer of the neural network, a number of neural processing nodes in the layer, node weights for each neural processing node in the layer, and activation functions for each neural processing node in the layer, wherein the neural processing node is located in the layer.

25. The at least one non-transitory machine-readable medium of claim 22, wherein the neural network processor is located in a vehicle, and wherein the operations further comprise:

determining the latency requirement; and
   determining local resources of the vehicle are not enough to execute the application within the latency requirement.

\* \* \* \* \*

UNITED STATES PATENT AND TRADEMARK OFFICE
CERTIFICATE OF CORRECTION

| | |
|---|---|
| PATENT NO. | : 11,403,517 B2 |
| APPLICATION NO. | : 16/143738 |
| DATED | : August 2, 2022 |
| INVENTOR(S) | : Tickoo et al. |

It is certified that error appears in the above-identified patent and that said Letters Patent is hereby corrected as shown below:

On the Title Page

In Column 2, under "Other Publications", Line 1, delete "Networksoverthe" and insert --Networks over the-- therefor In the Claims In Column 21, Line 35, in Claim 14, delete "ADAS system," and insert --ADAS,-- therefor Signed and Sealed this
Ninth Day of May, 2023

Katherine Kelly Vidal
*Director of the United States Patent and Trademark Office*